Figure 1:
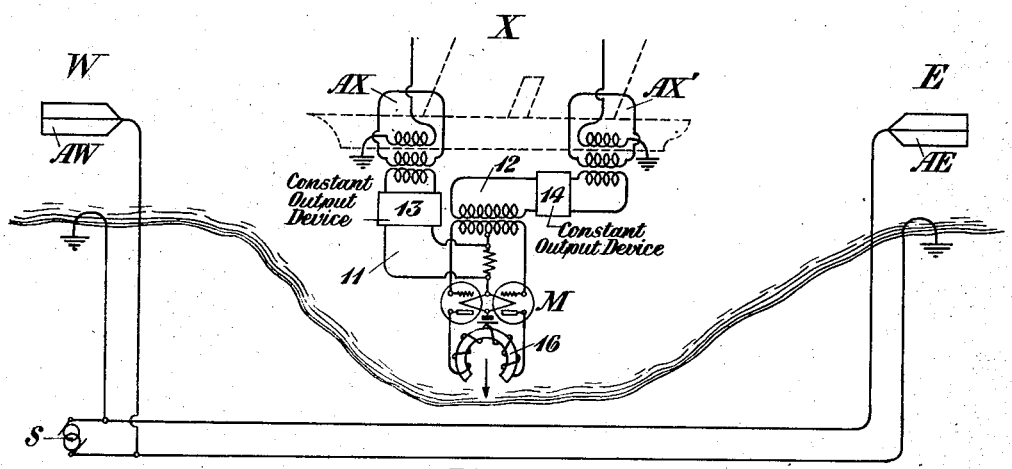

Nov. 24, 1925.

H. A. AFFEL

MOVEMENT AND POSITION INDICATOR

Filed May 5, 1923

1,562,485

3 Sheets-Sheet 1

INVENTOR
H. A. Affel
BY
ATTORNEY

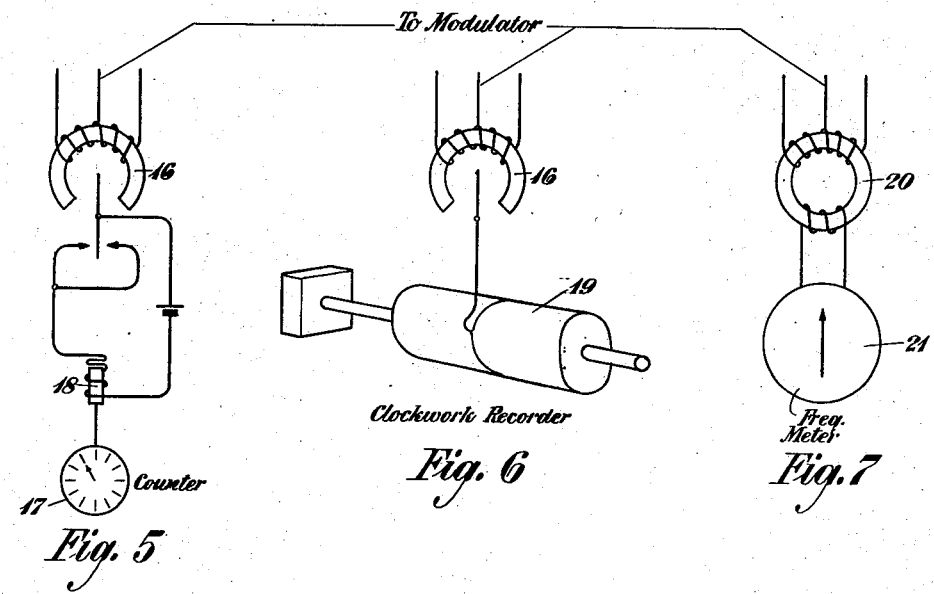
Fig. 5  Fig. 6 Clockwork Recorder  Fig. 7 Freq. Meter
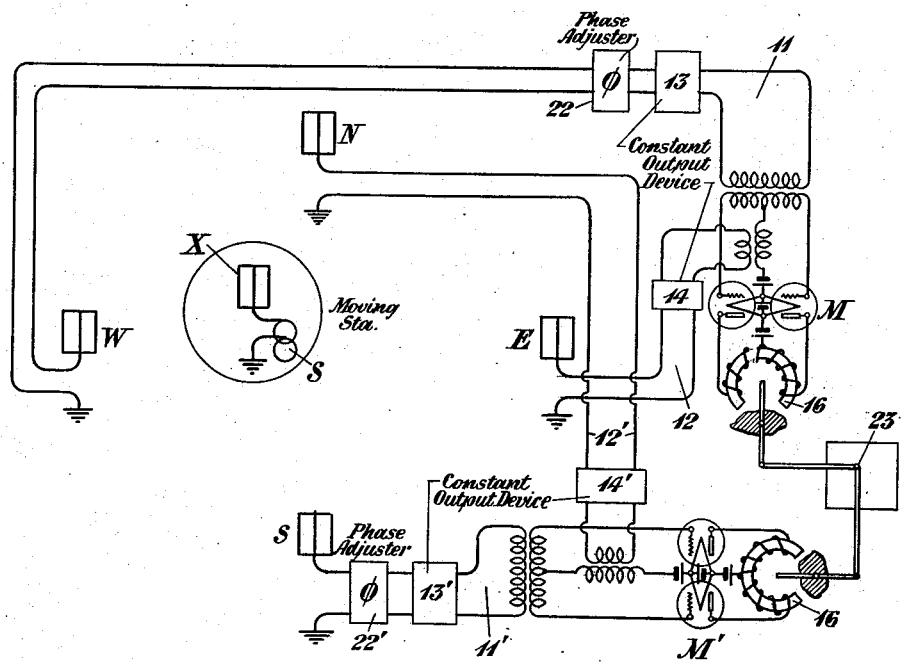
Fig. 8
INVENTOR
H. A. Affel
BY
ATTORNEY Nov. 24, 1925.
H. A. AFFEL
1,562,485
MOVEMENT AND POSITION INDICATOR
Filed May 5, 1923    3 Sheets-Sheet 3
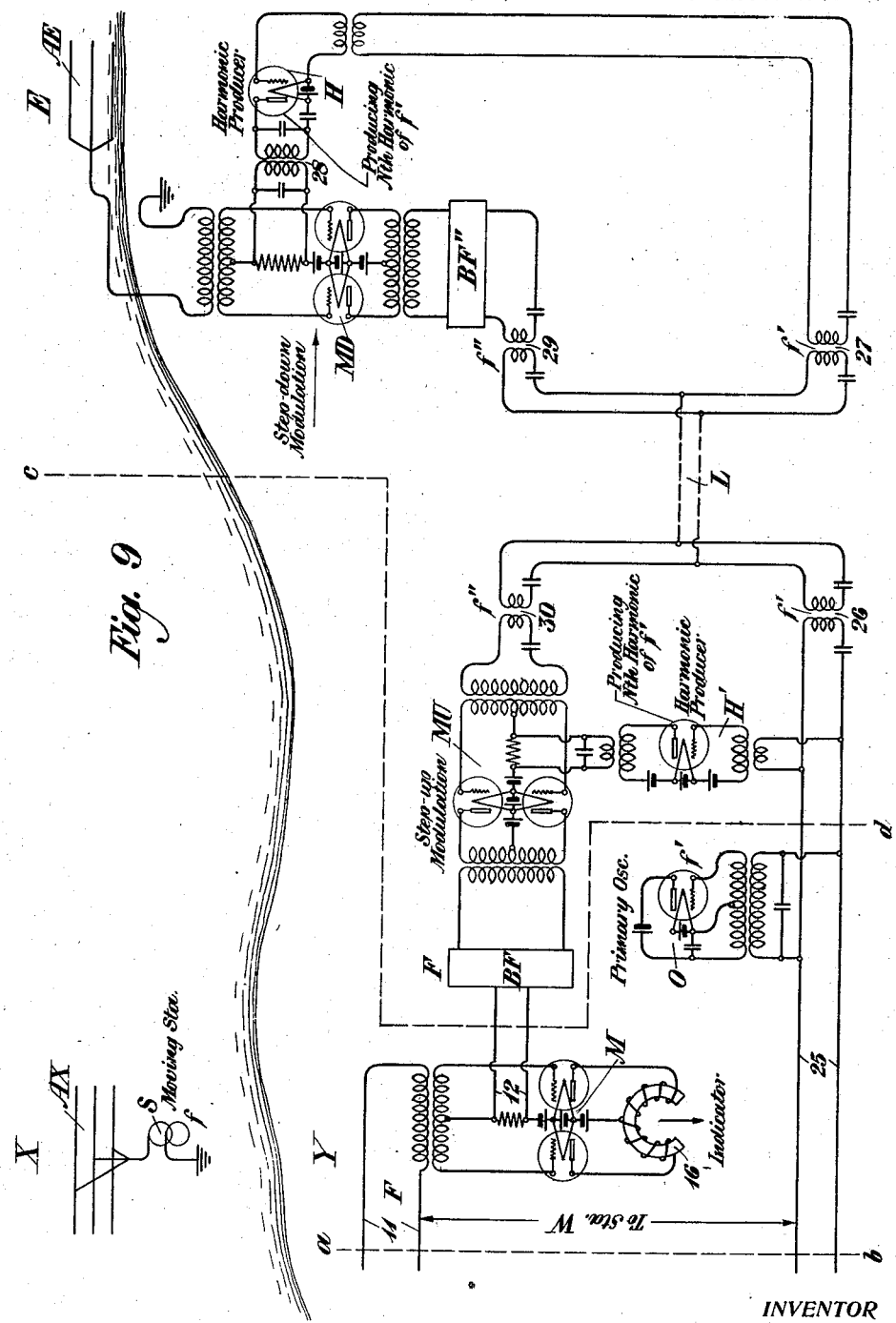
INVENTOR
H. A. Affel
BY
ATTORNEY Patented Nov. 24, 1925.

1,562,485

UNITED STATES PATENT OFFICE.

HERMAN A. AFFEL, OF BROOKLYN, NEW YORK, ASSIGNOR TO AMERICAN TELEPHONE AND TELEGRAPH COMPANY, A CORPORATION OF NEW YORK.

MOVEMENT AND POSITION INDICATOR.

Application filed May 5, 1923. Serial No. 636,864.

*To all whom it may concern:*

Be it known that I, HERMAN A. AFFEL, residing at Brooklyn, in the county of Kings and State of New York, have invented certain Improvements in Movement and Position Indicators, of which the following is a specification.

This invention relates to a radio signaling system and more particularly to a radio system for determining the rate of movement and position with respect to a fixed station of some moving object, such, for example, as an aeroplane or a ship.

If it were possible to provide at both a fixed radio station and a moving radio station sources of radio frequency current of the same absolutely constant frequency, then by receiving the energy at the moving station from the fixed station or vice versa and by determining its phase relation to the local supply, the position and rate of movement of the moving station could be determined.

Because of the obvious difficulty of providing at distant point sources of sufficiently constant frequency, it is proposed in accordance with the present invention to avoid this difficulty and obtain the same general result by using two fixed stations operating in conjunction with the moving station in accordance with either of two general methods. One method enables the moving station to determine its position movement while the other permits the fixed stations to follow the movement of the moving station.

For example, in accordance with one method, the movable station does not transmit any frequency, and the two fixed stations each radiate the same frequency supplied from the same generator. The moving station is provided with unidirectional antennæ, one of which receives from the one fixed station only and the other of which receives from the other fixed station only. The currents received from these two antennæ are led to the input circuits of a modulator such as a balanced vacuum tube modulator, the magnitude of the direct current component in the output of which is a function of the relative phases of the two input currents. Consequently, as the moving station moves in a line between the two fixed stations, the phase relations between the two received currents will vary through a complete cycle of 360° for each half wave length geographically traversed. This would manifest itself by a complete cycle of the receiving of the current in the output circuit of the modulator. Obviously the time of the complete cycle corresponds to the length of time taken by the moving station in moving a distance equal to a half wave length of the radiated frequency. Also the value of the current in the output of the modulator at any given instant is determined by the absolute position of the moving station within a given half wave length, so that the absolute position of the moving station may be determined if it is known to be within a particular wave length.

In accordance with another method of operation, the moving station acts as a transmitter of continuous waves which are received by the two fixed stations. In this case the energies from the two receiving antennæ of the two fixed stations are impressed upon a common modulating device such as that above referred to, and as the mobile object passes along a line between the two fixed stations the speed of movement and the absolute position of the moving station with respect to the two fixed stations will be indicated by the current in the output of the modulator.

Figure 2:
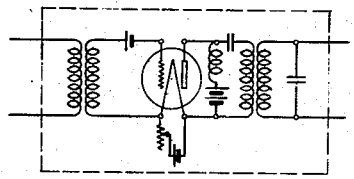
Figure 3:
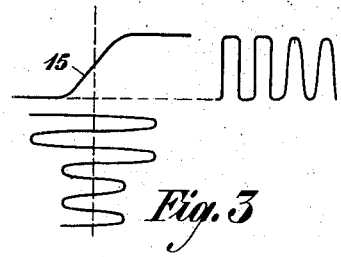
Figure 4:
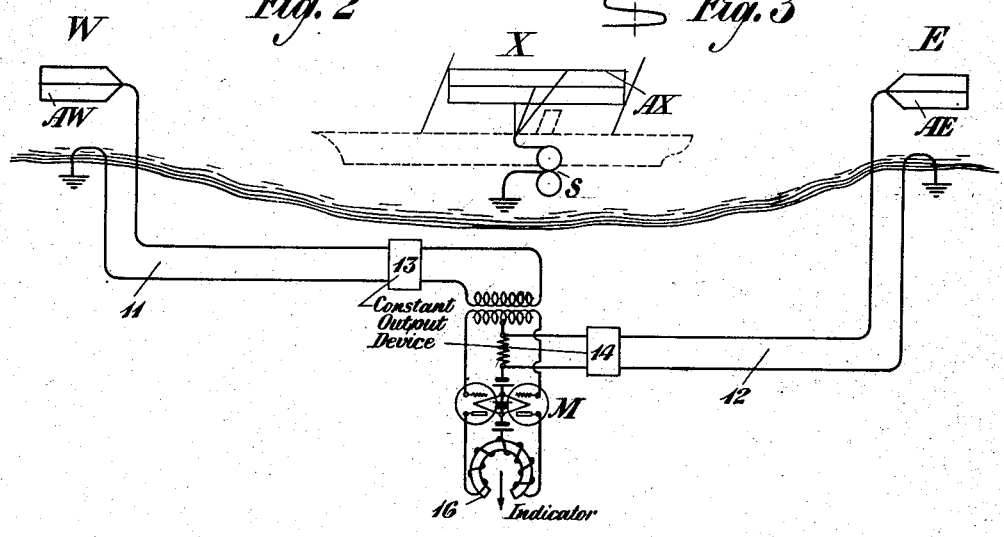

The invention may now be more fully understood from the following detailed description read in connection with the accompanying drawing, Figure 1 of which is a circuit diagram of an embodiment of the invention operating in accordance with the principles of the first method of operation above referred to. Fig. 2 is a circuit diagram of a constant output vacuum tube element used in practicing the invention. Fig. 3 shows curves illustrating the operation of the vacuum tube of Fig. 2. Fig. 4 is a circuit diagram of an embodiment of the invention operating in accordance with the second method above referred to. Figs. 5, 6 and 7 illustrate types of indicating or recording devices to be used in connection with the receiving modulator. Fig. 8 is a modified arrangement employing four fixed stations for determining the absolute location of a moving station within a square area, each of whose diagonals is equal to a half wave length of the radiated frequency, while Fig. 9 illustrates a refinement of the system of Fig. 4 adapted to overcome the difficulties due to attenuation where the two fixed stations are a considerable distance apart, so that the received currents must be transmitted over wire lines of some length to the modulator.

Referring to Fig. 1, a moving station X is illustrated as moving between two fixed stations E and W. Station E is provided with a suitable radiating antenna AE and station W is provided with a similar radiating antenna AW, each of the antenæ being supplied with high frequency energy from a common source S. The moving station is provided with two undirectional antenna systems AX and AX', the one of which has a maximum directive effect with respect to waves radiated from the station W, while it is practically opaque to waves radiated from station E, the other antenna system being most efficient in the reception of waves from the station A while being practically opaque with respect to waves radiated from the station W.

Many types of antenna systems having the characteristics above referred to are known in the art and, as an example, there is illustrated in Fig. 1 an antenna system consisting of a simple loop antenna associated with a vertical wire antenna, both antennæ being coupled to a common receiving circuit through a suitable transformer. By properly poling the transformer winding of the loop and vertical antenna respectively, the energy received by the vertical antenna may be caused to substantially neutralize the energy received by the loop from waves transmitted in one direction while aiding the energy received by the loop from waves transmitted in the opposite direction. The resultant effect of the combination of antennæ is to produce a substantially unilateral receiving antenna system.

The energy received by the antenna system AX may be impressed across neutral points of the input of the modulator M through a circuit 11. The energy received by the antenna system AX' may similarly be impressed through a circuit 12 upon the input of the modulator M in such a manner as to produce cumulative effects in the two elements of the modulator.

Obviously the relative amplitudes of the energy applied to the modulator M over the circuits 11 and 12 will vary as the moving station moves between stations E and W and, in order that the current in the output circuit of the modulator M may accurately indicate the position of the moving station, the value of the output current at a given instant must be a function only of the relative phases of the two input currents and must not vary with variations in the relative amplitudes of the input currents. In order that the currents supplied to the modulator over the circuits 11 and 12 may be at all times of constant amplitude regardless of the amplitudes of the energies received by the two antennæ systems AX and AX', constant output devices 13 and 14 of well known type may be included in the respective circuits 11 and 12.

A constant output device suitable for this purpose may, for example, be a vacuum tube having a circuit such as illustrated in Fig. 2. The vacuum tube may have its filament temperature so adjusted that its saturation point will correspond to an input potential of the smallest amplitude which will be received. The output currents of such a tube will not have amplitudes greater than the amplitudes corresponding to the minimum input current received even when the input potentials are very great. For example, referring to Fig. 3, 15 designates the characteristic curve of the tube of Fig. 2 plotted between grid potential and plate current. It will be observed that this characteristic is flat beyond the lower knee and is also flat above the upper knee. The upper flat part of the curve corresponds to what is known as saturation due to the fact that all of the electrons are utilized as current carriers, so further increase in the grid potential produces no increase in the current. If, now, the tube is so adjusted that the input potential wave oscillates about a point midway on the sloping part of the curve 15, input potentials oscillating beyond the upper and lower knee of the curve will produce no increase in the amplitude of the output current. For example, the input wave of large amplitude shown below the curve 15 produces an output wave whose amplitude is fixed by the two flat parts of the curve 15, so that the top and bottom portions of the output wave are cut off and a flattened wave is transmitted. When the oscillations of the input waves are smaller, as indicated at the lower part of the curve of the input wave in Fig. 3, the output waves will still have the same amplitude, providing the amplitude of the input wave is great enough to permit the input oscillations to extend to the two knees of the curve 15. It will be noted that the oscillations of the output wave shown at the right of Fig. 3 are of constant amplitude, although those oscillations corresponding to large input potentials are distorted by being cut off at the top and bottom. This distortion may be eliminated by tuning the output circuit of the tube of Fig. 2 as indicated.

The two waves of the same amplitude from the circuits 11 and 12 when impressed upon the balanced modulator M will produce a direct current component in the output circuit of the modulator M corresponding to the relative phases of the two input currents. For example, the effective direct current flowing through the two windings of the galvanometer 16 in the output circuit of the modulator M will be zero when the two input currents are 90° out of phase. When the input currents are 180° out of phase, the current through the galvanometer will be a maximum in one direction. When the input currents are 270° out of phase, the current through the galvanometer will again be zero, and when the input currents are 360° out of phase, the output current will be a maximum in the opposite direction. Consequently, the current through the galvanometer will pass through a complete cycle. One such cycle will occur for each half wave length traveled by the moving station X. This will be obvious when it is considered that the relative phases of the two frequencies transmitted from E and W respectively at the station X will vary as the moving station passes along the line from E to W. As the moving station recedes from the station E, the phase of the frequency transmitted from station E is retarded, but at the same time the phase of the frequency transmitted from the station W is advanced an equal amount. When the station X has moved through a quarter wave length, the wave station E will be retarded 90°, and the wave from station W will be advanced 90°, but the relative shift in phase will be 180°. Consequently, a complete shift in relative phase will occur each time the station X moves through a half wave length.

If the wave length is long, for example, sufficiently long so that it is equal to or exceeds the distance from E to W, it will be apparent that the magnitude of the current flowing in the galvanometer 16, together with its direction, will determine the absolute position of the moving station X between E and W. On the other hand, if the stations E and W are many wave lengths apart, or, in other words, if the frequency radiated be sufficiently high so that a wave length is a relatively small part of the total distance between E and W, a complete cycle of the current flowing through the galvanometer 16 will occur each time the station X moves a half wave length, so that by noting the number of cycles of current flowing through the galvanometer 16 in a given time the speed of the moving station may be determined.

The arrangement shown in Fig. 1 enables the moving station to determine its own speed and its position respecting the fixed stations E and W. Fig. 4 illustrates an arrangement, however, in which the speed and location of the moving station are determined at a fixed station. In Fig. 4, AE and AW designate antennæ at the stations E and W respectively. In this instance the antennæ are receiving antennæ instead of radiating antennæ as in Fig. 1. The moving station X is provided with a transmitting antennæ AX. It is not necessary that the transmitting antenna AX or the receiving antennæ AE and AW be directive. A source of radio frequency S is provided at the moving station, and the frequency radiated is absorbed by the antenna structures AE and AW at stations E and W, the relative phases of the oscillations absorbed being dependent upon the position of the moving station X between stations E and W. The energy absorbed by the station AE may be impressed upon neutral points of the modulator M through a circuit 12, while the energy received from the station W may be impressed upon the modulator cumulatively through the circuit 11. As in Fig. 1, the circuits 11 and 12 may be provided with constant output devices 13 and 14 respectively, so that the amplitudes of the oscillations received by the modulator from the two circuits will at all times be constant and equal.

The relative phases of the two waves absorbed at the stations E and W respectively will pass through 360° each time the moving station X shifts a half wave length in its position. Consequently, the waves impressed upon the modulator M will pass through a corresponding relative shift in phase, so that the output current flowing through the winding of the galvanometer or indicator 16 will pass through a complete cycle with each half wave length traveled by the station X. By observing the number of cycles of current variation in the galvanometer or indicator 16 in a given time, the absolute speed of the moving station X may be determined. Also by observing the amplitude and direction of the current through the galvanometer at a given instant, the absolute position of the moving station X with respect to a particular wave length may be determined.

Where the distance between the fixed stations is great as compared with the wave length employed, it may be desirable, in order to determine the total distance traversed by the moving station X to employ some recording or indicating device in connection with the modulator M. Such an arrangement is illustrated in Fig. 5, in which the galvanometer 16 is arranged to actuate a mechanical counter 17 through an electromagnetic device 18. The counter may be arranged to register directly the total number of cycles passed through, or it may be calibrated to indicate the total distance through which the moving station has passed.

In Fig. 6 the galvanometer 16 is schematically indicated as tracing the cyclic indications continuously upon a clockwork controlled recording cylinder 19. Where the wave length is quite short so that the moving station passes through a considerable number of wave lengths per second, it may be expedient to substitute for the galvanometer 16 a transformer device 20 through which any well known type of frequency meter 21 may be associated with the modulator as indicated in Fig. 7. The frequency meter will indicate the frequency of the cycles of the output current of the modulator and will consequently measure the speed of the moving station. For example, if the moving station is covering during each second a distance equal to 60 wave lengths of the frequency radiated by the source S, the frequency meter 21 would give an indication of 120 cycles per second, and, if desired, this indication may be calibrated to read directly in terms of units of distance per second. It will be understood, of course, that any one of the arrangements shown in Figs. 5, 6 and 7 may be employed with any of the receiving modulators illustrated herein.

The general principle illustrated in Figs. 1 and 4 is limited to the observation of a movement relative to the line connecting two fixed stations. It may, however, be extended to provide an absolute determination of the movement in two dimensional coordinates by the use of four fixed stations symmetrically disposed as illustrated in Fig. 8. In this figure four fixed stations N, E, S and W are provided, and the moving station X is moving within the area bounded by the four stations. The station X is provided with a source S for radiating a definite frequency which may be picked up by the receiving antennæ located at the four fixed stations. The stations E and W are connected to a modulator M through circuits 11 and 12 as in Fig. 4, and the circuits 11 and 12 are provided with suitable constant output devices 13 and 14. If desired, a phase adjuster 22 may be provided in one of the circuits 11—12. The stations N and S are similarly connected to a modulator M' through circuits 11' and 12' respectively, these circuits also being provided with constant output devices 13' and 14' respectively. A galvanometric instrument 16 is provided in the output circuit of the modulator M, and a similar instrument 16' is provided in the output circuit of the modulator M'. The instrument 16 will register the relative movement of the moving station S between fixed stations E and W while the instrument 16' registers the relative movement of the station S between fixed stations N and S. By linking the instruments 16 and 16' to a pointer 23, the absolute position of the moving station within a square area whose corners are a half wave length apart may be directly traced by the pointer.

Such an arrangement might be useful, for example, in a harbor where it is desired to ascertain the position of a moving vessel which cannot be seen because of fog or other reasons. If the harbor is only a few square miles in area, it will be a relatively simple matter to radiate from the source S a wave length more than twice as great as the greatest distance across the harbor, so that the pointer 23 might register upon a minature map of the harbor the exact location of the vessel at a given instant.

Where in a system such as that illustrated in Fig. 4 the stations E and W are a considerable distance apart so that the received high frequency oscillations must be transmitted a considerable distance over wire lines of the modulator M, it may be desirable to use an arrangement such as is shown in Fig. 9, which provides that the oscillations received at each fixed station may be stepped down in frequency before being transmitted over a line to the modulator, the stepped down oscillations being again stepped up to the original frequency at the point at which the modulator is located.

Referring to Fig. 9, the moving station X is provided with a source S whereby a frequency $f$ may be radiated from the station X. This frequency is received by the antenna AE at the station E. Owing to the high frequency of the energy received at E it is necessary to step it down in frequency in order to transmit it over the line L to the station Y at which the modulator M is located. Accordingly a source of relatively low frequency current may be provided at the station Y, said source being illustrated as a vacuum tube oscillator O supplying a frequency $f'$ to conductors 25. The frequency $f'$ passes through a tuned circuit 26 to the line L, and at the station E a similar tuned circuit 27 is provided to select the frequency $f'$ from the line L and impress it upon a harmonic producer H of a well known character. The harmonic producer H by distorting the frequency impressed on its input circuit produces in its output circuit frequencies which are harmonic of the impressed frequency. A tuned circuit 28 in the output of the harmonic producer H may be used to select some harmonic of the frequency $f'$ (for example, the $n$th harmonic) which differs in frequency not too greatly from the frequency $f$ radiated by the station X. The received frequency $f$ and the harmonic frequency of $f'$ are impressed upon a balanced modulator MD in the output circuit of which may be detected a frequency $f''$ corresponding to the difference between the two frequencies impressed upon the input circuit of the modulator MD. A suitable filter BF'' may be used to select the difference frequency $f''$ from other frequencies appearing in the output of the modulator MD, and the selected frequency may be passed through a tuned circuit 29 to the line L over which it may be transmitted to the station Y.

At the station Y the stepped down frequency $f''$ is selected by a tuned circuit 30 and impressed upon a step up modulator MU. The frequency $f'$ generated by the oscillator O will be impressed upon a harmonic producer H' at the station Y, the harmonic producer functioning to produce the $n$th harmonic of $f'$ which will be selected from its output circuit and impressed upon the modulator MU together with the stepped down frequency $f''$. The two frequencies $f''$ and the $n$th harmonic of $f'$ combine in the modulator MU to produce a frequency corresponding to their sum, which frequency will be the frequency $f$ received by the antenna AE. This frequency may be selected by a band filter BF in the output circuit of the modulator MU and impressed upon the modulator M which controls the indicating instrument 16.

It will be seen from the apparatus and operation thus far described that the frequency radiated by the station X and received at the station E is translated down in the frequency spectrum before transmission over the line L and after transmission over said line is again translated up in the frequency spectrum to its original position, so that finally the same frequency $f$ that is radiated from the station X is impressed upon the modulator M through the circuit 12. In order to impress upon the modulator M through the circuit 11 the frequency received by another fixed station W, apparatus (not illustrated) will be associated with the station Y at the left of the dotted line $ab$ corresponding to the apparatus shown in Fig. 9 at the right of the dotted line $cd$. As in the case of Fig. 4, the indicator 16 will give an indication corresponding to the relative phase displacement of the two waves received at stations E and W respectively, so that the position and speed of the moving station X with respect to the stations E and W may be determined.

It will be obvious that the general principles herein disclosed may be embodied in many other organizations widely different from those illustrated without departing from the spirit of the invention as defined in the following claims.

What is claimed is:

1. The method of determining the speed of a moving station with reference to two fixed stations, which consists in simultaneously receiving waves of the same frequency radiated between the moving station and each of the fixed stations respectively, producing an indication proportionate to the relative phases of the received waves which corresponds to the movement of the moving station, and determining from the number of cycles of relative phase shift per unit of time the number of wave lengths traveled by the moving station within that unit of time.

2. The method of determining the absolute position within a wave length of a moving station with reference to two fixed stations, which consists in receiving waves of the same frequency transmitted between the moving station and each fixed station respectively, producing an indication corresponding to the relative shift in phase of the two received waves, which corresponds to the movement of the moving station, and determining from said indication at a given instant the point in the cycle of relative phase shifts of the received waves which corresponds to the position of the moving station with reference to a given wave length at that instant.

3. The method of determining the rate of travel and the position within a wave length of a moving station with respect to two fixed stations, which consists in receiving two waves of the same frequency radiated between the moving station and each fixed station respectively and producing an indication determined by the relative shift in phase of the two received waves with the shift in position of the moving station.

4. In a signaling system, a moving station and two fixed stations, means for radiating two waves of the same frequency between the moving station and each of the fixed stations, a translating device, means to receive the two waves thus transmitted and impress them upon said translating device in phase relations with respect to each other determined by the position of the moving station with respect to the fixed stations, and means to indicate the phase shift of the two waves.

5. In a signaling system, a moving station and two fixed stations, mean for radiating two waves of the same frequency between the moving station and each of the fixed stations, a balanced modulator, means to receive the two waves thus radiated and to impress them upon the modulator in phase relations with respect to each other determined by the position of the moving station with respect to the fixed stations, and means associated with said modulator for producing an indication corresponding to the phase shift of the two impressed waves.

6. In a signaling system, a moving station and two fixed stations, means to radiate from the moving station to the fixed stations two waves of the same frequency, a translating device, means to receive the waves radiated to the fixed stations and to impress them upon said translating device in relative phases determined by the position of the moving station with respect to the fixed stations, and means associated with said translating device for producing an indication determined by the relative phase shift of the two waves impressed upon the translator.

7. In a signaling system, a moving station and two fixed stations, means to radiate from said moving station to said fixed station two waves of the same frequency, a balanced modulator, means to receive the waves radiated to said fixed station and impress said waves upon said balanced modulator in phase relations with respect to each other determined by the position of the moving station with respect to the fixed stations, and means associated with said modulator for producing an indication determined by the relative phase shift of the two impressed waves.

8. In a signaling system, a moving station and means to determine the position of said moving station within a given area comprising two pairs of fixed stations symmetrically disposed, means to radiate from the moving station to each of said fixed stations waves of the same frequency, a translating device associated with one pair of stations, means to impress upon said translating device the waves radiated to said pair of stations in phase relations with respect to each other determined by the relative position of the moving station with respect to said pair of stations, a translating device associated with the other pair of stations, means to impress upon said last mentioned translating device the waves radiated to said other pair of fixed stations in phase relations with respect to each other determined by the position of the moving station with respect to said last mentioned pair of stations, and means associated with each of said translating devices for producing indications conditioned by the phase shift of the two waves impressed upon each translating device, and means for integrating the indication of the two indicating means.

9. In a signaling system, a moving station and means to determine the position of said moving station within a given area comprising two pairs of fixed stations symmetrically disposed, means to radiate from the moving station to each of said fixed stations waves of the same frequency, a balanced modulator associated with one pair of fixed stations, means to impress upon said modulator the waves radiated to said pair of fixed stations, said waves being impressed upon said modulator in phase relations determined by the relative position of the moving station with respect to said pair of fixed stations, a balanced modulator associated with the other pair of fixed stations, means to impress upon the last mentioned modulator the waves radiated to said other pair of fixed stations, said waves being impressed in phase relations determined by the position of the moving station with respect to said last mentioned pair of fixed stations, indicating means associated with each modulator for producing an indication conditioned by the relative phase shift of the two waves impressed upon the corresponding modulator, and means for integrating the indications produced by the two indicating means.

In testimony whereof I have signed my name to this specification this 4th day of May, 1923.

HERMAN A. AFFEL.